June 11, 1968   C. J. MICHEEL   3,387,727
BOAT LOADER AND CARRYING MECHANISM FOR VEHICLES
Filed July 26, 1966   3 Sheets-Sheet 1

CARL J. MICHEEL
*INVENTOR*

BY
BUCKHORN, BLORE, KLARQUIST & SPARKMAN
*ATTORNEYS*

June 11, 1968  C. J. MICHEEL  3,387,727
BOAT LOADER AND CARRYING MECHANISM FOR VEHICLES
Filed July 26, 1966  3 Sheets-Sheet 2

CARL J. MICHEEL
INVENTOR
BY
BUCKHORN, BLORE, KLARQUIST & SPARKMAN
ATTORNEYS

June 11, 1968  C. J. MICHEEL  3,387,727
BOAT LOADER AND CARRYING MECHANISM FOR VEHICLES
Filed July 26, 1966  3 Sheets-Sheet 3
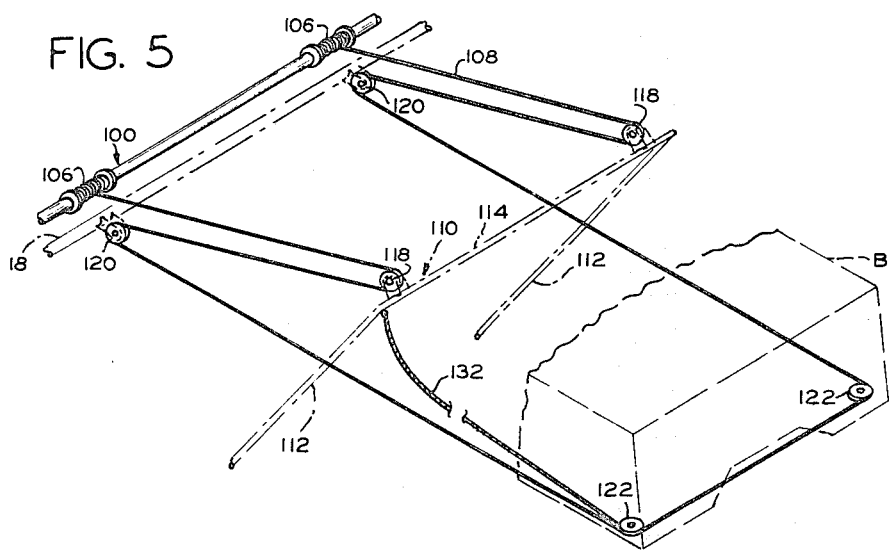
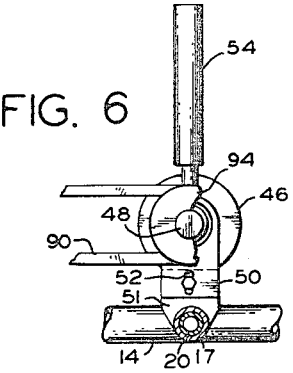
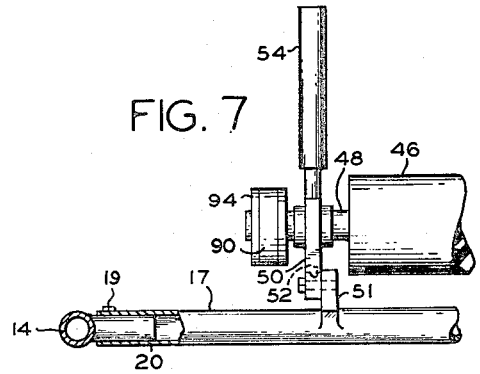
CARL J. MICHEEL
INVENTOR
BY
BUCKHORN, BLORE, KLARQUIST & SPARKMAN
ATTORNEYS United States Patent Office 3,387,727
Patented June 11, 1968

3,387,727
BOAT LOADER AND CARRYING MECHANISM
FOR VEHICLES
Carl J. Micheel, 2108 SE. 156th Ave.,
Portland, Oreg. 97233
Filed July 26, 1966, Ser. No. 567,875
5 Claims. (Cl. 214—450)

ABSTRACT OF THE DISCLOSURE

A boat loader and carrying mechanism for campers and like vehicles having easily damaged tops, having a rectangular frame adapted to be mounted horizontally above the top of the vehicle and supported at its front by the cab and at its rear by the rear bumper of the vehicle. A lifting frame is pivotally supported on the rear bumper for placement under the bow of a boat when the same is in an inverted position behind the vehicle, the lifting frame being adapted to be rotated from a generally horizontal position to a generally vertical position to lift the bow to a position adjacent the rear of the horizontal frame. A winch and cable attached to the frame draw the boat up and onto the horizontal frame.

---

This invention relates to a boat loader and carrying mechanism for automotive vehicles and, more particularly, to a boat loader and carrying mechanism that is especially adapted for use with campers and other vehicles whose tops will not permit them to support the weight of a heavy structure.

The usual "camper" consists of a pick-up truck on the bed of which is mounted a cabin or other camping body. The cabin often extends higher than does the cab of the vehicle and is generally unsuited for the support of heavy loads. Thus, the sportsman or other person desiring to transport a boat on his vehicle has found it difficult to mount a boat on top of the vehicle and whose mechanisms that have been available have tended to damage the camper cabins.

The primary object of this invention is thus to provide a boat loading and carrying mechanism for vehicles of the class described that will permit one operator to load and unload a boat onto and off the vehicle. Thus, the present mechanism is designed to lift the boat from the ground up to the top of the vehicle where it may be readily secured for transportation and easily removed for use as desired.

A further object of the present invention is to provide a boat loading and carrying mechanism for vehicles of the class described that will be supported in a manner that will avoid damaging the vehicle's top.

A still further object of the present invention is to provide a boat loading and carrying mechanism for vehicles of the class described that will be operative under adverse weather conditions, including the presence of relatively strong winds.

These and other objects and advantages are achieved by providing a loading and carrying mechanism for boats comprising a generally rectangular frame that will carry the boat in inverted position on top of a vehicle of the class described, said frame, however, being supported by the cab and the rear bumper of the vehicle, and not in any way by the camper cabin itself. A lifting frame is provided, and this is also supported by the rear bumper. The lifting frame is adapted to be placed under the bow of the boat when the same is in an inverted position behind the vehicle, and is adapted to be rotated from a generally horizontal position to a generally vertical position, at which latter position the bow of the boat will be elevated so as to be adjacent to a rear horizontal roller mounted at the rear of the frame. Winch means, including an endless cable entrained around pulleys attached to the stern are adapted to draw the boat up onto the rear roller and thence onto middle and front rollers also mounted on the frame. Since the entire apparatus, including the lifting frame, is kept free of the camper top, no damage to the same is possible. Furthermore, since the lifting frame is pivotally supported by the rear bumper of the vehicle, the boat during the loading operation is always maintained close to the camper top, and this is advantageous when loading or unloading in strong winds.

Other advantages will become apparent from the following specification, when considered in the light of the attached drawings, in which:

FIG. 5 is a perspective view of the loading mechanism of the present invention shown as it is lifting a boat onto the apparatus, the stern of the boat being shown in phantom;

FIG. 6 is a sectional view taken on line 6—6 of FIG. 2; and

FIG. 7 is a sectional view taken on line 7—7 of FIG. 2.

Figures 1, 2:
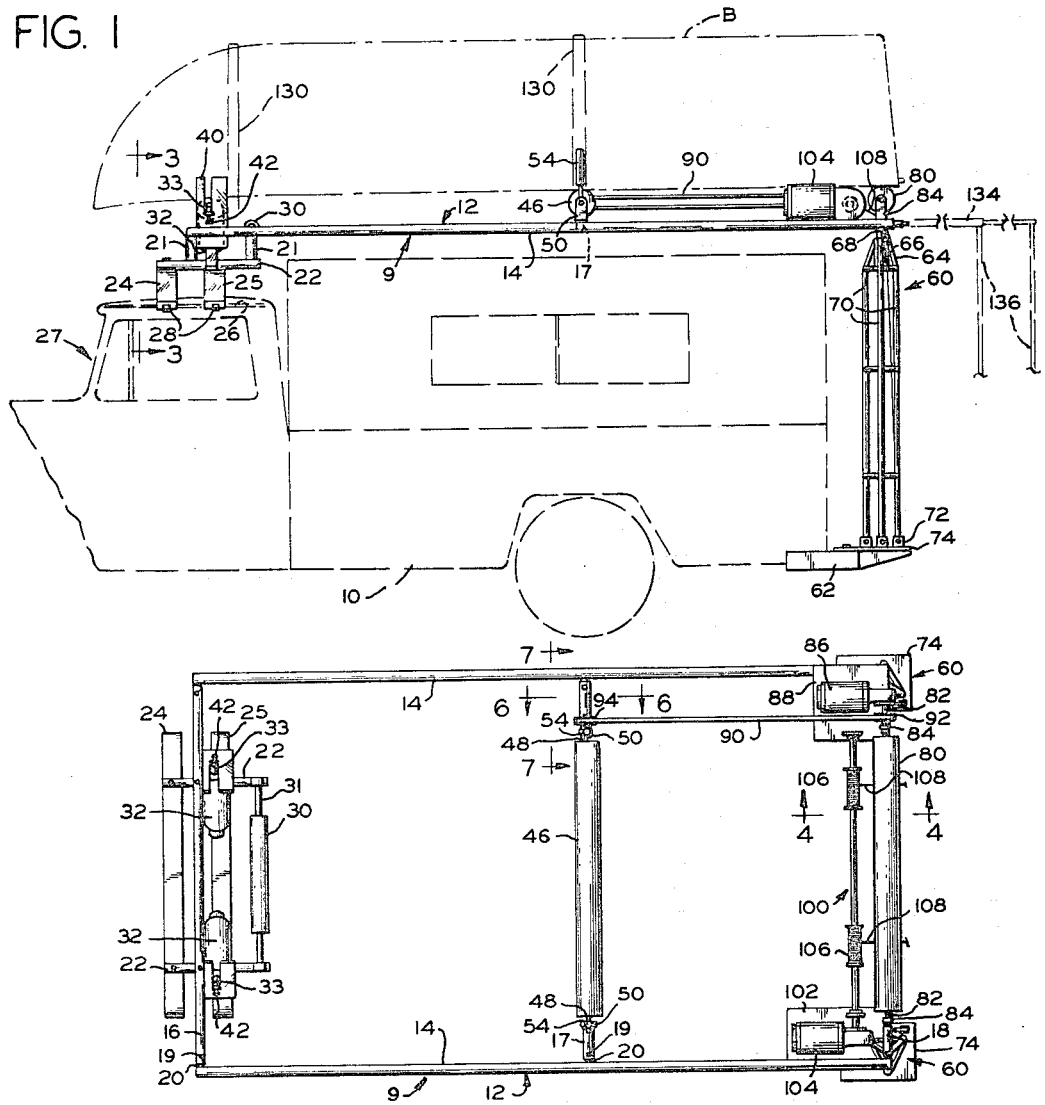
FIG. 1 is a side elevational view of a boat loader and carrying mechanism made in accordance with the present invention shown mounted on a vehicle of the class described and supporting a boat.
FIG. 2 is a top plan view of the boat loader and carrying mechanism shown in FIG. 1.

Referring now to the drawings and particularly to FIGS. 1 and 2, a boat loader and carrying mechanism 9 in accordance with the present invention is shown mounted on a camper 10, although it should be understood that the mechanism is readily adapted to be used with other vehicles whose tops are also easily damaged. The mechanism 9 includes a rectangular frame 12 having a pair of longitudinal frame members 14 made from extruded aluminum tubing and held apart by three cross members 16, 17 and 18 located at the front, middle and rear of the frame, respectively. The cross members 16, 17 and 18 may also be made of aluminum tubing and they desirably are telescoped over and detachably secured by removable pins 19 to short pieces of tubing 20 which are welded to the longitudinal frame members 14. This form of construction permits the frame 12 to be disassembled for easy storage and shipment.

Figure 3:
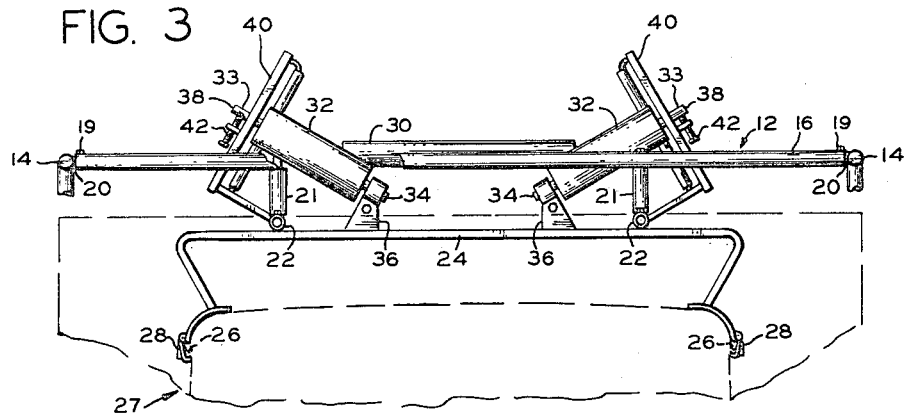
FIG. 3 is a front elevational view taken on line 3—3 of FIG. 1.

As shown in FIGS. 1, 2 and 3, the front cross member 16 is supported by tubular struts 21 attached to horizontal support members 22, which in turn are bolted to two transverse carriers 24, 25, supported by the drain gutters 26 of the cab 27 and held thereto by clips 28. Journaled at the rear of the horizontal support member 22 is a front horizontal roller 30 rotatable about an axle 31.

Two inclined rollers 32 having axles 33 are also supported on the transverse carriers 24, 25 with the inwardly extending ends 34 of the axles 33 journaled in brackets 36 welded to the rear transverse carrier 25. The outwardly extending ends 38 of the axles 33 are elevated above the inwardly extending ends 34 and are journaled in brackets 40, such that the ends 38 are movable by adjusting screws 42 to accommodate differing bow configurations.

A solid center horizontal roller 46 fixed to an axle 48 and rotatable as hereinafter described is journaled in brackets 50 which are bolted to lugs 51 welded to the middle cross member 17. (See FIGS. 6 and 7.) The brackets 50 have elongated slots 52 therein, so that the height of the center roller 46 may be adjusted up and down. This permits the boat to be held high enough so that the bow can ride on the front roller 30 as the boat is loaded onto the carrying mechanism 9 from the rear. Two guides 54 are also attached to the top part of the brackets 50 to provide lateral restraint for the boat.

Figure 4:
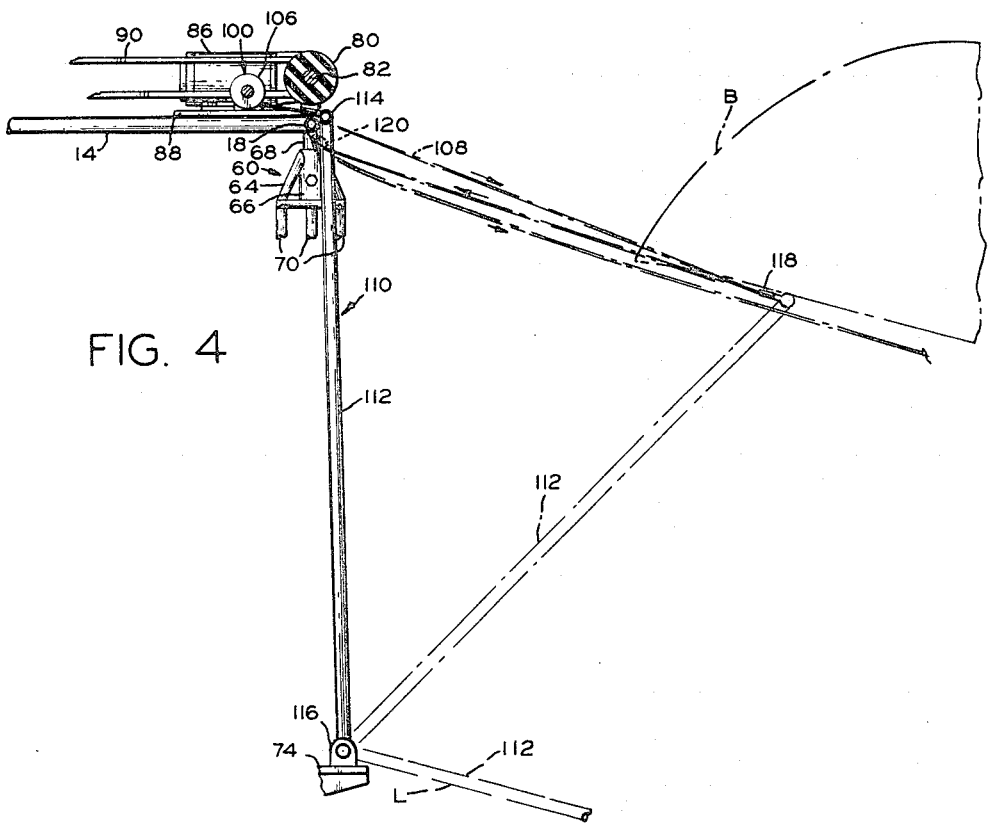
FIG. 4 is a sectional view taken on line 4—4 of FIG. 2 and showing the bow of a boat in phantom lines.

As shown in FIGS. 1 and 4, the rear of the frame 12 is supported by two vertical supports 60 which rest on the rear bumper 62 of the camper. Each of the supports 60 comprises an upper bracket 64 attached to the rear cross member 18 by pieces of tubing 66 telescoped over and pinned to short pieces of tubing 68 welded to the rear cross member 18, thereby to provide a means for vertical adjustment. The bracket 64 is in turn supported by three vertical pieces of tubing 70, the bottoms of which are bolted to upstanding lugs 72 welded to a plate 74 bolted to the rear bumper 62 of the camper. As will be obvious, this type of support does not place any load on the top of the camper and thus avoids the possibility of any injury thereto.

A solid rear horizontal roller 80 fixed to an axle 82 is journaled in brackets 84 attached to the rear cross member 18. This roller 80 is driven by a reversible electric motor 86 mounted on a plate 88 attached to the frame members 14 and 18, as shown. The roller 80 is connected to the center horizontal roller 46 by a belt drive 90 driven around rear and center pulleys 92 and 94, respectively. (See FIGS. 2, 6 and 7.)

A hoisting winch 100 is attached to the plate 88 and to a similar plate 102 at the other side of the frame 12 and is driven by another reversible electric motor 104. The winch 100 includes two driven drums 106 around which an endless hoisting cable 108 is entrained as shown.

As shown in FIGS. 4 and 5, a lifting frame 110 including legs 112 to which is attached a crossbar 114 is pivotally mounted on brackets 116 attached to the plate 74 on the rear bumper 62. The endless cable 108 extends from the drums 106 around pulleys 118 attached to the crossbar 114, thence around pulleys 120 attached to the rear cross member 18 and thence around idler pulleys 122 which are snapped or hooked to the stern of the boat B, as shown in FIG. 5. As is obvious from the pulley arrangement, when the drums 106 wind the cable 108 up, the frame 110 moves twice as fast as do the pulleys 122, thereby to lift up the bow of the boat which is placed on the crossbar 114 before the entire boat is moved ahead an appreciable amount.

To load a boat onto the carrying mechanism of the present invention, the reversible electric motor 104 is first caused to unwind the cable 108 from the drums 106 to permit the lifting frame 110 to drop from the vertical position shown in the solid lines in FIG. 4 to its lowermost horizontal position shown by the lower dotted lines L in FIG. 4. The bow of a boat B to be loaded upon the carrying mechanism 9 is then placed upon the crossbar 114 of the frame 110 and the cable 108 is entrained around the pulleys 122 in the stern of the boat B. reversed to wind up the cable 108 around the drums 106. Since the pulley arrangement causes the lifting frame 110 to move at a faster rate with respect to the frame 12 than does the stern of the boat, the bow of the boat will lift clear up before the boat is pulled ahead an appreciable amount. Since pulleys 122 are used at the stern of the boat and the cable is endless, the pull on the stern of the boat is kept even, notwithstanding the fact that one of the drums 106 may actually wind up slightly faster than the other. The bow of the boat B then takes the position shown by the dotted lines in FIG. 4 as it approaches the rear of the frame 12.

The winding up of the cable 108 is continued until the bow of the boat approaches the rear horizontal roller 80. At this time the electric motor 86 is started, thereby to rotate both the rear and center horizontal rollers 80 and 46. As the bow of the boat makes contact with the rear horizontal roller 80, the pull of the cable 108 on the stern of the boat together with the rotation of the roller 80 combine to move the boat forwardly over the roller 80 and onto the carrying mechanism 9. Both the motors 86 and 104 are continued in operation and the boat is caused progressively to ride first over the rear horizontal roller 80, then over the center horizontal roller 46, then onto the front horizontal roller 30, and finally onto the inclined rollers 32 into its ultimate carrying position as shown in FIG. 1, at which time the motors are stopped. Hold-down straps 130 are then fastened to retain the boat in position, secured for transportation. The boat is unloaded from the carrying mechanism by reversing this procedure. During the loading and unloading operation, tag lines 132 from the lifting frame 110 to clips in the stern of the boat are used (see FIG. 5) such that when the bow of the boat clears the rear of the frame 12, the boat cannot be pulled off the lifting frame 110, thereby to fall to the ground and be damaged.

The tubular frame construction permits the carrying mechanism 9 to be adapted to another use, namely that of housing smaller tubing which may be pulled out to make a frame for a tent or other shelter in back of the camper. Thus, each of the longitudinal frame members 14 has a section of smaller tubing 134 inside it which may be pulled out, as shown in the phantom lines in FIG. 1, to make a tent frame equal to the width of the camper. The smaller interior tubing sections 134 are supported at their ends and intermediate thereof by adjustable metal legs 136, thereby to provide a frame which may be covered with a fabric. The interior tubing 134 is held in place within the longitudinal frame members 14 by screws or pins when the camper is in motion.

In the foregoing description, the invention has been described with reference to a certain particular preferred embodiment, although it is to be understood that the specific details shown are merely illustrative and that the invention may be carried out in other ways without departing from the true spirit and scope of the following appended claims.

I claim:
1. A boat loader and carrying mechanism for campers and other vehicles having a rigid cab, a rear bumper adapted to sustain loads and a camper cabin or like structure mounted behind said cab and having an easily damaged top, said mechanism comprising:

a generally rectangular frame having forward and rear ends for carrying a boat in inverted position, said frame being adapted to be removably mounted in horizontal relationship above the top of a vehicle of the class described, said frame including elongated longitudinal members and cross members positioned approximately at the front, middle and rear thereof;

means to support the front of said frame on said cab;

means to support the rear of said frame on said rear bumper of said vehicle;

rolling means mounted on said frame for supporting said boat and permitting it to move longitudinally with respect to said frame;

a lifting frame pivotally supported on said rear bumper of said vehicle and adapted to be placed under the bow of said boat when said boat is in an inverted position behind said vehicle, said lifting frame being adapted to be rotated from a generally horizontal position to a generally vertical position, wherein said bow of said boat is elevated to a position adjacent the rear of said frame;

winch means attached to said frame and including a driven drum; and cable means connecting said drum and said lifting frame and being attached to the stern of said boat, whereby winding up said winch means elevates said lifting frame and said bow of said boat and draws said boat onto said rolling means, said boat thereby being supported and transportable on said frame.

2. A boat loader and carrying mechanism as described in claim 1, in which said rolling means comprises:
  a horizontal roller positioned at the front end of said frame;
  two inclined rollers mounted on said frame forwardly of said horizontal roller, the outwardly extending ends of said inclined rollers being elevated above the inwardly extending ends thereof, said inclined rollers being adapted to support the bow of said boat when mounted on said frame;
  a middle horizontal roller mounted on said middle cross member and adapted to support said boat amidships; and
  a rear horizontal roller supoptred at the rear of said frame and adapted to support the stren of said boat.

3. A boat loader and carrying mechanism as described in claim 2, further comprising:
  means to rotate said middle and rear horizontal rollers to assist in moving said boat with respect to said frame.

4. A boat loader and carrying mechanism as described in claim 2, in which
  said rear cross member is provided with pulleys at each end thereof; and
  said lifting frame is provided with pulleys at each side thereof.

5. A boat loader and carrying mechanism as described in claim 4, in which said cable means comprises:
  an endless cable passing from said driven drum around said pulleys attached to said lifting frame, around said pulleys attached to said rear cross member and around pulleys attached to the stern of said boat, whereby winding up said winch means elevates said lifting frame and said bow of said boat adjacent said rear horizontal roller and causes said cable to move said boat progressively onto said rear, middle and front horizontal rollers, said bow of said boat being supported by said inclined rollers.

References Cited

UNITED STATES PATENTS

| | | | |
|---|---|---|---|
| 2,584,163 | 2/1952 | Squires | 214—450 |
| 2,812,087 | 11/1957 | Zoller | 214—450 |
| 3,045,849 | 7/1962 | Tweten | 214—450 |
| 3,128,893 | 4/1964 | Jones | 214—450 |

HUGO O. SCHULZ, *Primary Examiner.*